(12) United States Patent
Kostrov et al.

(10) Patent No.: US 6,899,175 B2
(45) Date of Patent: May 31, 2005

(54) METHOD AND APPARATUS FOR SEISMIC STIMULATION OF FLUID-BEARING FORMATIONS

(76) Inventors: Sergey A. Kostrov, 5945 W. Parker Rd., Apt. 1731, Plano, TX (US) 75093; William O. Wooden, 5928 Henley Dr., Plano, TX (US) 75093

( * ) Notice: Subject to any disclaimer, the term of this patent is extended or adjusted under 35 U.S.C. 154(b) by 105 days.

(21) Appl. No.: 10/132,371

(22) Filed: Apr. 24, 2002

(65) Prior Publication Data

US 2003/0201101 A1 Oct. 30, 2003

Related U.S. Application Data

(63) Continuation of application No. PCT/US99/28060, filed on Nov. 23, 1999, which is a continuation-in-part of application No. 08/927,032, filed on Sep. 10, 1997, now Pat. No. 6,015,010.

(51) Int. Cl.$^7$ ............................................... E21B 43/25
(52) U.S. Cl. .................. 166/249; 166/177.1; 166/177.2
(58) Field of Search .............................. 166/249, 177.1, 166/177.2, 177.5, 177.6

(56) References Cited

U.S. PATENT DOCUMENTS 3,209,834 A * 10/1965 Essary
5,586,602 A * 12/1996 Vagin .......................... 166/249
5,950,726 A * 9/1999 Roberts ....................... 166/249
6,015,010 A * 1/2000 Kostrov ....................... 166/249
2002/0185276 A1 * 12/2002 Muller et al. ................ 166/297

* cited by examiner

Primary Examiner—William Neuder

(57) ABSTRACT

An apparatus and seismic method for producing an shock wave in an oil well borehole, with a pumping unit arranged at the wellhead, a tubing string extending downward into the production casing of the well, a hollow cylinder assembly connected with the bottom of the tube string, and pair of plungers arranged within the cylinder assembly and connected with the pumping unit with sucker rods and a polish rod for compressing liquid contained within the cylinder assembly and discharging the compressed liquid into the production casing, thereby generating a shock wave. The cylinder assembly includes an upper cylinder, a lower cylinder below the upper cylinder, a crossover cylinder below the upper and lower cylinders, and a compression chamber cylinder containing a compression chamber arranged between the crossover cylinder and the upper cylinder. The lower cylinder is adapted to receive the lower plunger, and the upper cylinder is adapted to receive the upper plunger. The lower plunger has a larger diameter than the upper plunger, and the plunger movement effects the volume of the compression chamber by reduction, the liquid contained therein becomes compressed and is discharged on the down stroke into the well. In addition, remote seismic data is collected and processed from remote well locations.

54 Claims, 5 Drawing Sheets

METHOD AND APPARATUS FOR SEISMIC STIMULATION OF FLUID-BEARING FORMATIONS

CROSS REFERENCE TO RELATED APPLICATIONS

This application is a continuation of PCT application No. PCT/US99/28060, dated Nov. 23, 1999, which is a continuation-in-part of U.S. Ser. No. 08/927,032, dated Sep. 10, 1997, issued Jan. 18, 2000 as U.S. Pat. No. 6,015,010.

TECHNICAL FIELD

The present invention relates to a shock wave generating method and device and, more particularly, to a method and device for repeatedly generating shock waves in an injection well borehole to increase oil recovery and oil production and to carry out the continuous seismic survey of oil an bearing formation.

BACKGROUND OF INVENTION

Seismic surveys, taken at different stages in the life of an oil field, are used to locate pockets of hydrocarbons. These types of surveys are generally referred to as 4-D seismic surveys which incorporate data relating to depth, width, length and time. Problems have been encountered because of the lack of compatibility of surveys performed at various times. Analysis of the data is expensive and often unreliable.

In conducting seismic surveys, energy is released that travels through the earth in the form of vibrations called seismic waves. The seismic waves move in all directions and gradually grow weaker as the distance increases from the source.

There are two kinds of seismic waves. Body waves, the fastest seismic waves, move through the earth. Body waves may be compression waves or shear waves. As the waves pass through the earth, they cause particles of rock to move in different ways. Compressional waves push and pull the rock. Shear waves make rocks move from side to side. Compressional waves can travel through solids, liquids, or gasses, but shear waves can pass only through solids. Compressional waves are the fastest seismic waves and are often referred to as primary waves. Shear waves travel slower and are referred to as secondary waves. Seismograph instruments are equipped with sensors called seismometers that can detect ground motions caused by seismic waves. A seismograph produces wavy lines that reflect the size of seismic waves passing beneath it. The record of the wave, called a seismogram, is printed on paper, film or recording tape or is stored and displayed by computers.

A need exists for a controllable source of seismic energy for use in 4-D seismic mapping which provides compatible data for use in 4-D seismic mapping. Further, a long felt need exists for a source of seismic energy which is controllable so that it can be "fine-tuned" to a particular formation to provide optimum performance in stimulating production of hydrocarbons.

Seismic or elastic wave stimulation is a known technique for enhancing oil recovery from an oil bearing bed as described in "Elastic-Wave Stimulation of Oil Production: A Review of Methods and Results," Geophysics Vol. 59, No. 6 (June 1994).

Various devices for imparting a shock wave to a well are known in the patented prior art. The Russian Federation Patent No. 1,710,709, for example, discloses a method and apparatus in which an anvil plate is arranged at the bottom of the well and a heavy weight in the form of water filled tubing is repeatedly lifted and dropped onto the anvil plate, thereby imparting vibrations to the oil bed. However, the repeated impact of the weight eventually destroys the bottom of the well. The amount of damage can be minimized by limiting the impact force applied to the anvil plate, but this lowers the power of the elastic waves which reduces efficiency. In addition, the efficiency of this method is limited by a low energy transfer coefficient of the potential energy of the weight into the energy of the elastic waves.

Kostrov USSR Patent No. 1,674,597, granted May 1, 1991 discloses a well hydro-acoustic generator comprising a frame with inlets and outlets, a conical nozzle, a resonant diaphragm and a conical deflector. The conical deflector has a particular angle providing optimum reflection of waves created by the generator and the resonant diaphragm such that the whole energy of the wave is transferred into the direction of the casing wall.

The O Vagin U.S. Pat. No. 5,586,602 discloses a method and apparatus for increasing the effectiveness of shock wave stimulation of oil-bearing formations which includes a pumping unit arranged at the wellhead, a tubing string which extends downwardly into the production casing of the well, a stuffing box arranged on top of the tubing string, a cylinder connected with the bottom of the tubing string, and a plunger which reciprocates up and down within the tubing string and cylinder. As the plunger moves upwardly, the fluid in the tubing string is compressed. At the top of the pumping unit upstroke, the plunger exits the top of the cylinder so that the fluid in the tubing string is discharged into the production casing, thereby generating a shock wave. Although this method achieves higher efficiency than the method described in the Russian Patent No. 1,710,709 discussed above, it is limited in terms of its reliability, effectiveness and efficiency because (1) a cement/bridge plug must be installed to pressurize the borehole, (2) the pressure on the front of the shock wave must be limited due to the low reliability of the stuffing box undergoing a high periodic pressure, (3) additional surface equipment must be used to compensate for liquid leaking through the stuffing box, casing, cement plug, and other equipment, and (4) it is unable to generate a shock wave near the bottom hole for wells having a depth of greater than 800–1000 feet.

Wagner et al U.S. Pat. No. 5,836,389 discloses a conical-shaped diffuser-deflector which is described as being positioned such that as the wave impacts the diffuser-deflector, the wave is partially deflected in an outward direction and at least a portion of the impulse wave continues down-hole, to impact a bridge plug. As the wave deflects off of the bridge plug, weak elastic waves are then maintained in a lower area of the well by a packer and the diffuser-deflector.

Roberts U.S. Pat. No. 5,950,726 discloses well stimulation apparatus which employs an underground casing which provides a sealed vessel in which is supported a tubing string. The casing the tubing string are filled with a working fluid and a pumping unit reciprocates a plunger within the tubing string to cyclically pressurize and depressurize the working fluid for creating elastic wave energy. A hollow conical projector is supported at the lower end of a pump barrel to amplify and direct energy waves. Working fluid substantially fills the tubing assembly and the sealed vessel formed by the well head, the casing and a bridge plug installed above perforations in a live or abandoned well.

Vagin U.S. Pat. No. 5,586,602, Wagner et al U.S. Pat. No. 5,836,389 and Roberts U.S. Pat. No. 5,950,726 disclose processes which require that the well be completely filled with liquid and sealed for forming a closed system.

The present invention was developed to overcome these and other drawbacks of the prior devices by providing an improved method and apparatus for producing an elastic shock wave in a borehole which includes pumping means arranged at the wellhead, a tubing string extending downwardly into the production casing of the well, a hollow cylinder assembly connected with the bottom of the tubing string, and a pair of plungers arranged within the cylinder assembly for compressing liquid contained within the cylinder assembly and discharging the compressed liquid into the production casing, thereby generating a shock wave.

SUMMARY OF INVENTION

Accordingly, a primary object of a first embodiment of the present invention is to provide an apparatus for producing a shock wave in a borehole, such as a well, which includes a pumping unit arranged at the wellhead, a tubing string extending downwardly into the production casing of the well, a hollow cylinder assembly connected with the bottom of the tubing string, and a pair of plungers arranged within the cylinder assembly and connected with the pumping unit with sucker rods and a polish rod for compressing liquid contained within the cylinder assembly and discharging the compressed liquid into the production casing, thereby generating a shock wave. The cylinder assembly includes a hollow upper cylinder, a hollow lower cylinder arranged below the upper cylinder, a crossover cylinder arranged between the upper and lower cylinders, and a compression cylinder containing a compression chamber arranged between the crossover cylinder and the upper cylinder. The lower cylinder has a larger inner diameter than the upper cylinder and the lower plunger has a larger diameter than the upper plunger. In addition, the internal bore of the lower cylinder is adapted to receive the lower plunger, and the internal bore of the upper cylinder is adapted to receive the upper plunger. When the plungers are displaced upwardly in the cylinder assembly, the lower plunger travels into the compression chamber and the upper plunger travels out of the compression chamber. Due to the lower plunger having a greater diameter than the upper plunger, the volume of the compression chamber is reduced and the liquid contained therein becomes compressed. When the pumping unit reaches the top of its stroke, the lower plunger allows the compressed liquid contained in the compression chamber to be discharged into the well.

It is another object of the invention to provide an apparatus for producing a shock wave in a borehole in which the lower plunger includes an upper portion having a generally smooth outer perimeter which creates a generally liquid tight interface between the lower plunger and the lower cylinder, and a lower portion containing a plurality of flow channels which allow liquid to flow past the lower plunger into the lower cylinder when the lower portion of the plunger is displaced beyond the lower cylinder. In addition, the lower plunger includes an internal bore and a ball for selectively allowing the passage of liquid upwardly through the lower plunger into the compression chamber when the lower plunger is displaced downwardly.

It is a further object of the present invention to provide a method of producing a shock wave in a borehole which includes the steps of installing a tubing string and cylinder assembly in the borehole, filling the borehole and cylinder assembly with a liquid, providing a pair of plungers in the cylinder assembly, and displacing the plungers to compress the liquid contained in the cylinder assembly and discharge the liquid into the borehole.

In operation, the first embodiment of the apparatus is installed in a borehole so that the hydrostatic fluid level in the well is higher than the top of the upper cylinder. The motion of the pumping unit causes the plungers to move up and down in the upper and lower cylinders. On the upstroke, the liquid in the compression chamber is compressed and at the top of the stroke, the lower plunger allows liquid to flow past lower plunger into lower cylinder. At that moment the compressed liquid contained in the compression chamber is released, thereby generating a shock wave which propagates downwardly until it strikes the bottom of the well and propagates farther into the formation. On the downstroke, the upper part of the lower plunger is reinserted into the lower cylinder while the upper plunger remains inside the upper cylinder, thereby providing the seal needed to compress the liquid in the compression chamber during the upstroke.

A primary object of the second embodiment of the present invention is to provide a method and apparatus for producing a shock waves in a borehole of the injection well which includes a pumping unit arranged at the wellhead, a tubing string extending downwardly into production casing of the injection well, packer installed on tubing string, perforated cylinder connected with the bottom of the tubing string below a packer, a sealing device installed at the bottom of the perforated cylinder, a hollow cylinder assembly connected with the bottom of a sealing device, amplifier installed at the bottom of the cylinder assembly and a plunger assembly arranged within the cylinder assembly and connected via the sealing device with the pumping unit by means of sucker rod string, having at least one sucker rod and a polish rod for vacuuming water contained within cylinder assembly and discharging the water containing in the production casing into the vacuumed volume of the cylinder assembly on downstroke, thereby generating a shock waves. The cylinder assembly includes a vacuum chamber connected with a bottom of the sealing device, a hollow lower cylinder arranged below the vacuum chamber and a preventive cylinder arranged between the vacuum chamber and lower cylinder. In addition, the internal bore of a lower cylinder is adapted to receive the lower plunger. When the plunger is displaced downwardly in the cylinder assembly, the plunger travels out of the vacuum. Due to the plunger travels out of the cylinder assembly the volume of vacuum chamber is increased and the water contained therein becomes vacuumed. When the pumping unit reaches the bottom of its stroke, the top of the plunger exits from the bottom of the lower cylinder allowing the water contained in casing to be discharged into the vacuum chamber generating a first shock wave.

When the plunger is displaced upwardly in the cylinder assembly, the plunger travels into the vacuum chamber and the volume of vacuum chamber is decreased and the water contained therein becomes compressed. When the pumping unit reaches the top of its stroke, the bottom of the plunger exits from the top of the lower cylinder allowing the compressed water contained in vacuum chamber to be discharged into the casing generating shock wave. It is another object of the invention to provide an apparatus for producing a shock wave in borehole of injection well in which the preventive cylinder connected with the top of lower barrel has an inner diameter $ID_{pc}$ defined by the following formulae:

$$ID_{pc} \geq D_{lp}\left(1 + \frac{ID_c^2 P}{D_{lp}^2 (\rho_w g H - P_d)\xi}\right)^{1/2},$$

where $D_{lp}$ is the diameter of lower plunger, $ID_c$ is an inner diameter of vacuum chamber, $\rho_w$ is the density of water, g is the constant of the acceleration of gravity, H is the installation depth of preventive cylinder, $P_d$ is the saturation vapor pressure, $\xi$ is the coefficient of the flow resistance, P is pressure inside vacuum chamber.

It is another object of present invention to provide an apparatus for producing a shock wave in borehole of injection well in which the lower cylinder includes an amplifier, having the inner diameter in accordance with expression $ID_a(x) = ID_{lp} \exp(x\alpha/2)$ (wherein x is a current length of amplifier, $\alpha$ is a coefficient), has an optimum total length l defined by the formulae:

$$l = \frac{\alpha}{2m^2 - \alpha^2},$$

where $m = (\alpha^2 - k^2)^{1/2}$, $k = \omega/c$, $\omega$ is frequency of shock wave occurrence, c is a sound of velocity in the water.

It is another object of present invention to provide an apparatus for producing a shock wave in borehole of injection well in which a string of sucker rods installed inside the vacuum chamber includes a stabilizing rod installed on the top of plunger and the length of stabilizing rod is defined by expression:

$$L_{sr} \leq \pi l d_{sr} \frac{1}{n} \left( \frac{E}{P(D_{lp}^2 - D_{up}^2)} \right)^{1/2},$$

where $L_{sr}$ is the length of stabilizing rod, $\pi = 3.14$, I is the main central radius of inertia of cross section of middle rod, $d_{sr}$ is a diameter of middle rod, E is modulus of elasticity of the rod's material, P is the pressure inside the vacuum chamber, $D_p$ is the diameter of plunger, $D_{is}$ is the inner diameter of sealing device, n is a safety coefficient.

It is another object of present invention to provide an apparatus for producing a shock wave in borehole of injection well in which a diameter of the sucker rod string is defined by the following formulae:

$$d_r \geq \{\rho_w / (\rho_s - \rho_w)[1 - \{\frac{4\beta_a V_c}{\pi(D_p^2 - D_s^2)L_{str}}\}^k]\{D_p^2 - D_{ls}^2)\}^{1/2},$$

where $\rho_w$ is a water density, $\rho_s$ is a steel density, $\beta_a$ is a coefficient of air/gas content in the injected water, Vc is a volume of the vacuum chamber, $D_p$ is a diameter of plunger, $D_{is}$ is an inner diameter of sealing device, k is the a adiabatic coefficient, $L_{str}$ is the length of stroke.

It is another object of present invention to provide an apparatus for producing a shock wave in borehole of injection well in which the length of said lower cylinder defined by the following formulae:

$$L_{lc} \leq L_{str}[\frac{L_r(D_p^2 - D_{ls}^2)}{Ed_r^2}(P_u - P_d) + \frac{g(\rho_s - \rho_w)L_r^2}{E} + 2 L p],$$

where $L_{lc}$ is the length of the lower cylinder, $L_{str}$ is the length of stroke, $L_r$ is a length of the rod assembly, $D_p$ is the diameter of plunger, $D_{is}$ is the inner diameter of sealing device, E is modulus of elasticity of the rod's material, $P_u$ is the pressure inside the vacuum chamber on upstroke, $P_d$ is the pressure inside the vacuum chamber on downstroke, g is the constant of the acceleration of gravity, $\rho_w$ is a water density, $\rho_s$ is a steel density, $L_p$ is a length of the plunger.

It is another object of present invention to provide an apparatus for producing a shock wave in borehole of injection well in which a plunger has a tapers on both of its end with angle $\alpha$ not less than 10° and the ratio between length $l_t$ of said taper and diameter $D_p$ of said plunger has to be not more 0.5.

It is further object of present invention to provide a method of producing a shock waves in a borehole of injection well which includes the steps of installing in borehole of injection well a tubing string with packer, perforated cylinder connected with the bottom of the tubing string and installed below the packer, the sealing device connected with the bottom of perforated cylinder and the cylinder assembly connected with the sealing device and including preventive cylinder installed on the top of lower cylinder and amplifier installed at the bottom of lower cylinder, providing a plunger assembly including at least one sucker and stabilizing rods inside the cylinder assembly, and displacing the plunger to vacuum the water contained in the cylinder assembly and discharge water contained in borehole into vacuumed volume of the cylinder assembly on downstroke or discharge the compressed water contained in cylinder assembly into borehole of injection well on upstroke.

It is another object of present invention to provide a method for the control of the amplitude of shock wave in borehole of injection well in which the amplitude of the shock wave at the bottom of downstroke $A^d_{sw}$ is defined by the formulae:

$$A^d_{SW} = \rho_w g H_{lc}[1 - \{\frac{4\beta_a V_c}{\pi(D_p^2 - D_{ls}^2)L_{str}}\}^k],$$

where $\rho_w$ is a water density, $\beta_a$ is a coefficient of air/gas content in the injected water, Vc is a volume of the vacuum chamber, $D_p$ is a diameter of plunger, Dis is an inner diameter of sealing device, k is the a adiabatic coefficient, $L_{str}$ is the length of stroke, g is the constant of the acceleration of gravity, $H_{lc}$ is the depth of installation of the lower cylinder.

It is another object of present invention to provide a method for the control of the amplitude of shock wave in borehole of injection well in which the amplitude of the shock wave at the top of upstroke $A^u_{sw}$ is defined by the formula:

$$A^u_{SW} = k \frac{b}{V_c} \int_0^{T/2} [\frac{\pi}{4}(D_p^2 - D_{ls}^2)V_r - \frac{\pi}{\mu} P \delta^3 .0102(\frac{D_p}{L_p} + \frac{D_{ls}}{L_{ls}})]dt,$$

where $\pi = 3.14$, $T = 60/n$, n is quantity stroke per minute, b is the compressibility coefficient of the injection water, $V_c$ is the volume of the vacuum chamber, P is the pressure inside the vacuum chamber, $D_p$ is a diameter of plunger, $D_{is}$ is a an inner diameter of sealing device, $L_p$ is the length of plunger, $L_{is}$ is the length of sealing device, $V_r$ is the speed motion of the sucker rod string, $\mu$ is viscosity of the injection water, k is the coefficient of fluid displacement by plungers, $\delta$ is a clearance inside the sealing device and between the plunger and lower cylinder.

It is another object of present invention to provide a method for producing of shock wave in borehole of injection well in which the amplifier is installed on the distance S from the bottom of the well defined by formulae:

$$S = \frac{c}{2f},$$

where c is a sound of speed of water containing in borehole, f is dominant frequency of formation.

In operation, the second embodiment of the apparatus is installed inside a borehole of injection well so that the fluid level in the borehole of the injection well is higher than the depth of the installation of packer thereby filling the borehole and the cylinder assembly by the fluid/water. The motion of pumping unit causes the plunger to move down and up in the cylinder assembly. On downstroke, the plunger is moved downward inside the cylinder assembly thereby providing the vacuuming water contained in vacuum chamber due to the increase of the volume of cylinder assembly while the sealing device provides the necessary sealing of the volume of cylinder assembly. When the plunger exits the bottom of the lower cylinder, the water contained in the borehole of injection well is discharged into the lower cylinder and, correspondingly, into vacuum chamber, thereby generating a shock wave which propagates downwardly until it strikes the bottom of the well and perforations and propagates farther into formation. On upstroke, the plunger is reinserted into the lower barrel and water contained in the cylinder assembly is compressed while the sealing device provides the necessary sealing of the volume of cylinder assembly. When the bottom of the lower plunger exits the top of the lower cylinder, the compressed water contained in vacuum chamber is released into the lower cylinder and, correspondingly, borehole, thereby generating a shock wave which propagates downwardly until it strikes the bottom of the well and perforations and propagates farther into formation. The water from the casing refills the cylinder assembly until the lower plunger will not be reinserted into the lower cylinder during the beginning of downstroke and the circle will not be repeated.

BRIEF DESCRIPTION OF THE DRAWINGS

Drawings of two preferred embodiments of the invention are annexed hereto so that the invention may be better and more fully understood, in which.

Numeral references are employed to designate like parts throughout the various figures of the drawing.

DETAILED DESCRIPTION OF A PREFERRED EMBODIMENT

Figure 1:
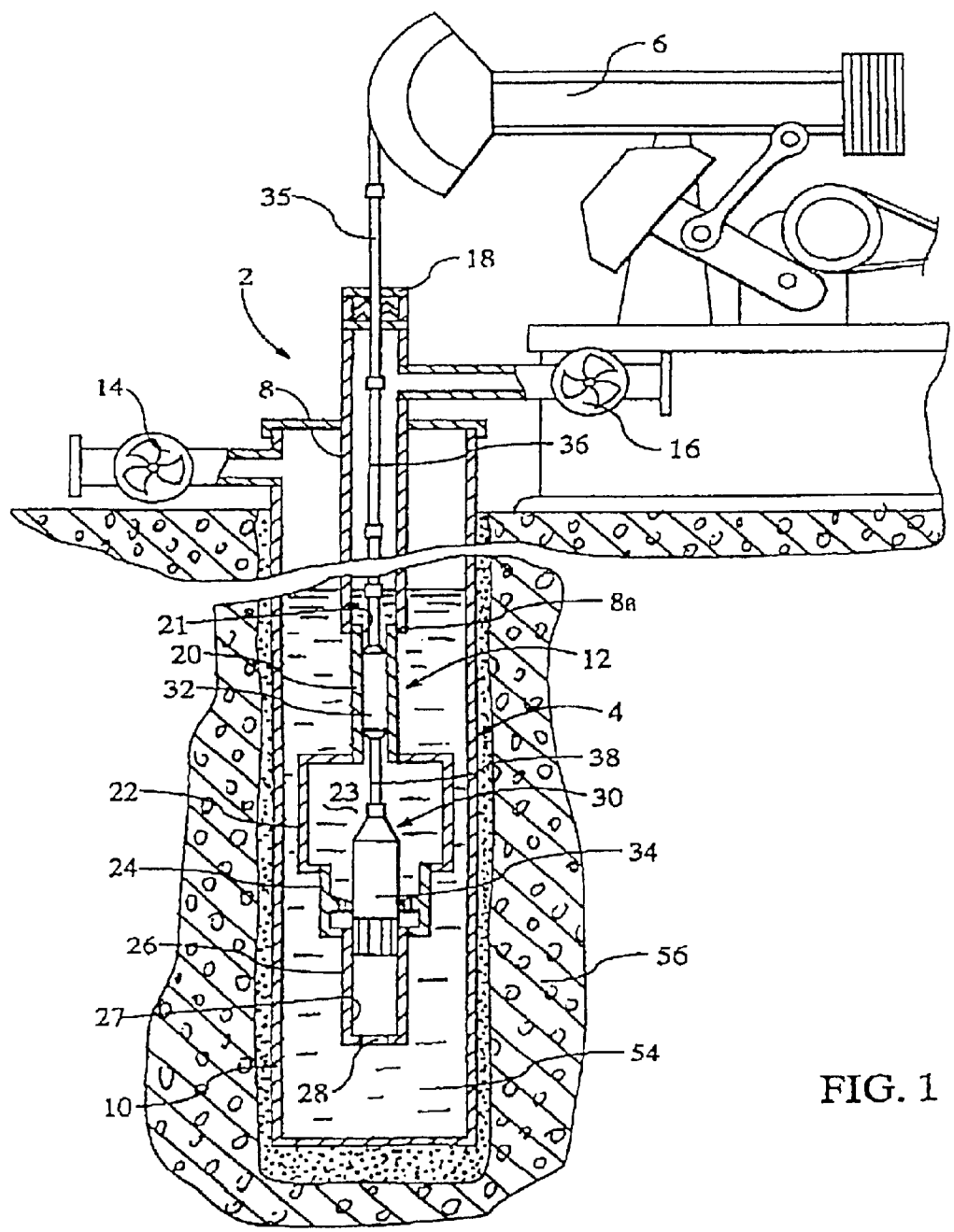
FIG. 1 is a cross-sectional side view of the device according to the invention installed in a well.

Referring first to FIG. 1, there is shown a device 2 for producing a shock wave in a borehole or well 4. The device includes a pumping unit 6 arranged at the wellhead, a tubing string 8 extending downwardly into the perforated production casing 10 of the well, and a cylinder assembly 12 connected with the lower end 8a of the tubing string. A casing valve 14, a tubing valve 16, and a stuffing box 18 are also arranged at the wellhead.

The cylinder assembly 12 includes an upper cylinder 20 connected with the lower end of the tubing string 8a, a compression cylinder 22 connected with the lower end of the upper cylinder 20, a crossover cylinder 24 connected with the bottom of the compression cylinder 22, and a lower cylinder 26 connected with the bottom of the crossover cylinder 24. The upper cylinder contains an internal bore 21, the compression cylinder contains a compression chamber 23, and the lower cylinder contains an internal bore 27, and an opening 28 in its lower end.

A plunger assembly 30 includes an upper plunger 32 adapted to fit within the internal bore 21 of upper cylinder 20, and a lower plunger 34 adapted to fit within the internal bore 27 of lower cylinder 26. For reasons described below, the diameter of the upper plunger 32 is smaller than the diameter of the lower plunger 34. The upper plunger 32 is connected with the pumping unit 6 with a polish rod 35 which extends through the stuffing box 18, and a plurality of sucker rods 36 which extend through the tubing string 8. One or more connection rods 38 connect the upper plunger 32 with the lower plunger 34.

Figure 2:
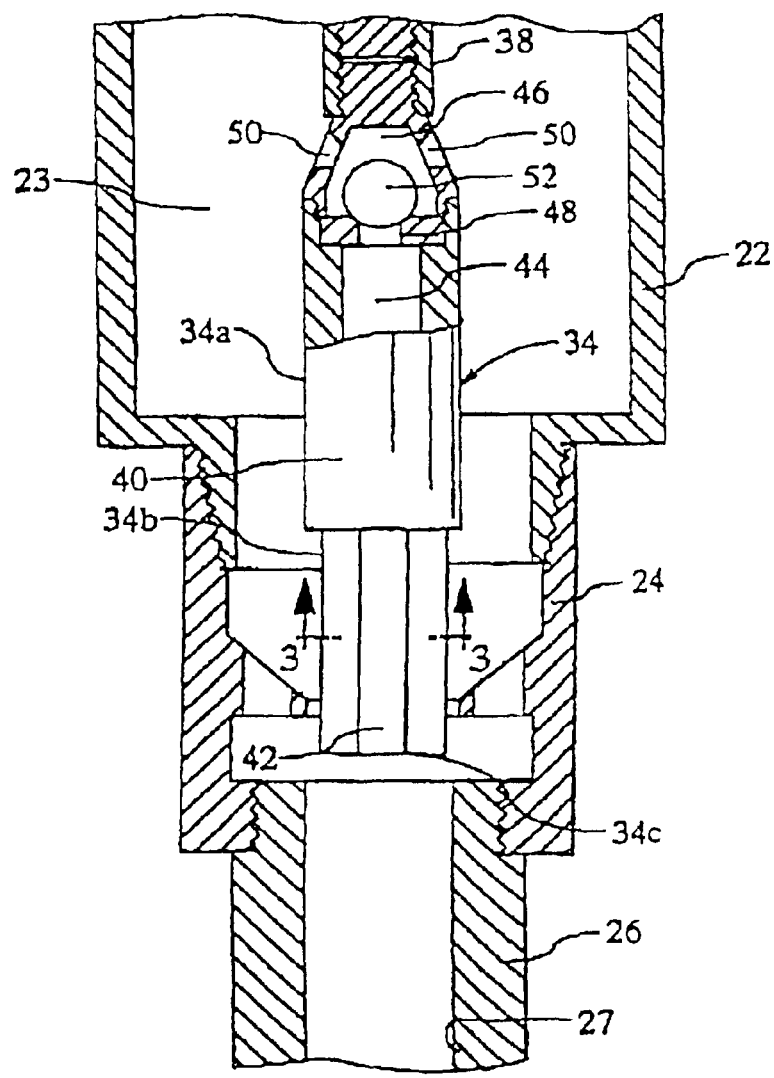
FIG. 2 is a detailed view of the lower plunger in the compression chamber.
Figure 3:
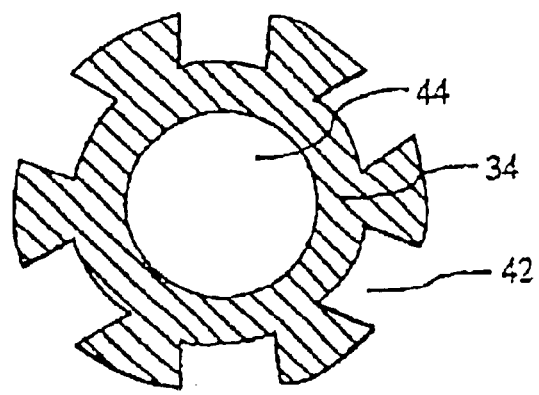
FIG. 3 is a cross-sectional view of the lower portion of the lower plunger.

As shown in FIGS. 2 and 3, the lower plunger 34 includes an upper portion 34a having a smooth outer surface 40 which forms a generally water-tight seal with the internal bore 27 of the lower cylinder 26, and a lower portion 34b which contains a plurality of flow channels 42. A flow-through bore 44 extends longitudinally through the plunger from a ball chamber 46 contained in the upper portion of the plunger to the lower end 34c of the plunger. A seating ring 48 is arranged between the ball chamber 46 and the flow-through bore 44.

The ball chamber 46 includes ports 50 and contains a ball 52 adapted to mate with seating ring 48. When the lower plunger 34 is displaced upwardly during the compression stroke, the ball 52 engages the seating ring 48, thereby preventing the flow of liquid through the flow-through bore 44. When the lower plunger 34 is displaced downwardly, the ball 52 disengages the seating ring 48, thereby allowing liquid to flow upwardly through the flow-through bore 44 into the compression chamber 23.

Operation:

To generate a shock wave in the well using the device, the well 4 and cylinder assembly 12 are filled with a suitable liquid 54, such as water. The hydrostatic level of the liquid in the well must be higher than the top of the upper cylinder 20. During the upstroke of the pumping unit 6, the volume in the cylinder assembly between the bottom of the upper plunger 32 and the lower plunger 34 is reduced. Accordingly, the water contained therein is compressed. The volume reduction is due to the fact that the large diameter lower plunger 34 displaces more liquid than the small diameter upper plunger 32 as each moves in tandem upwardly in the cylinder assembly 12. The volume of the compression chamber is defined by the following:

$$V_c = \frac{\pi/4(d_2^2 - d_1^2)L_s - (q_2 - q_1)}{Pb} - \pi/4(d_2^2 - d_r^2)L_s$$

where:

$$q_1 = \frac{\pi d_1 P \delta_1^3}{\mu l_1}$$

$$q_2 = \frac{\pi d_2 P \delta_2^3}{\mu l_2}$$

$q_1$ and $q_2$ are the slippage losses between the plunger and cylinder surfaces for the upper and lower plungers, respectively;

$d_1$ and $d_2$ are the diameters of the upper and lower plungers, respectively;

$d_r$ is the diameter of the connection rod(s) 38;

$L_S$ is the length of the stroke;

$\delta_1$ and $\delta_2$ are the clearances between the inner surface of the cylinder and the outer surface of the plunger for the upper and lower plungers, respectively;

$l_1$ and $l_2$ are the length of the upper and lower plungers, respectively;

$\mu$ is the viscosity of the compressed liquid;

P is the pressure on the front of the shock wave; and b is the compressibility coefficient of the liquid.

At the moment the upper portion 34a of the lower plunger 34 exits the lower cylinder 26, the compressed liquid is discharged into the lower cylinder 26 and into the production casing 10, thereby creating a shock wave which impacts the bottom of the well. Part of the shock wave energy is reflected back toward the wellhead while part is transmitted into the surrounding bed or formation 56 to stimulate oil production therein.

The high efficiency of the present invention is due to the high power of the shock wave created. A high power wave can be created because the maximum pressure is not limited by the working pressure of the stuffing box, the "floating" of the polish rod, or other possible casing leaks. The present invention allows any reasonable maximum pressure on the front of the shock wave to be created as defined by the following equation:

$$N = \frac{\pi d_2^2 P^2}{8\rho c}$$

where

N is the power of the shock wave;

$d_2$ is the diameter of the lower plunger 34;

P is the maximum pressure of the compressed liquid between the upper 32 and lower 34 plungers;

$\rho$ is the density of the liquid; and c is the velocity of sound in the liquid.

Thus, if the pressure P is increased two times, the power of the wave is increased four times and the amount of the formation affected by the wave is greatly increased.

Since the present invention does not require that the borehole volume be sealed, the need for a cement plug is eliminated. In addition, the present invention can be arranged in the vicinity of the bottom of the well, thereby reducing energy losses of the shock wave traveling in the casing. However, it should be appreciated that a bridge plug may be set in the casing above the bottom of the well, if it is deemed expedient to do so, to effect hydraulic isolation of a section of the well bore. It should be understood that if a bridge plug is installed in the well bore between the bottom of the well and the device for producing a shock wave, the location where the bridge plug is installed is deemed to be the bottom of the well.

While in accordance with the provisions of the Patent Statutes the preferred forms and embodiments of the invention have been illustrated and described, it will be apparent to those of ordinary skill in the art that various changes and modifications maybe made without deviating from the inventive concepts set forth above.

DETAILED DESCRIPTION OF A SECOND EMBODIMENT

Figure 4:
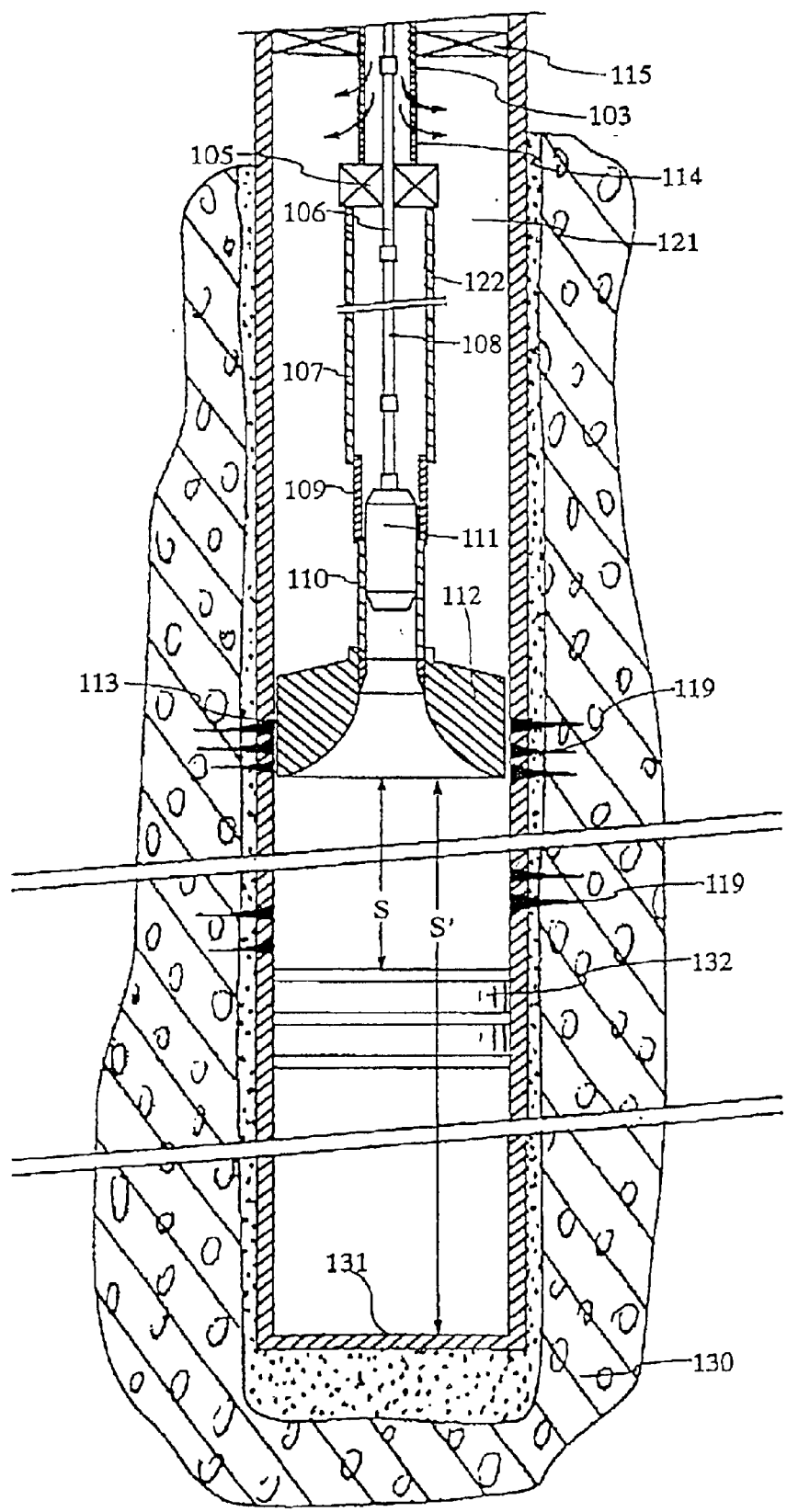
FIG. 4 is a cross-sectional side view of a second embodiment of the device according to the invention installed in the injection well.
Figure 5:
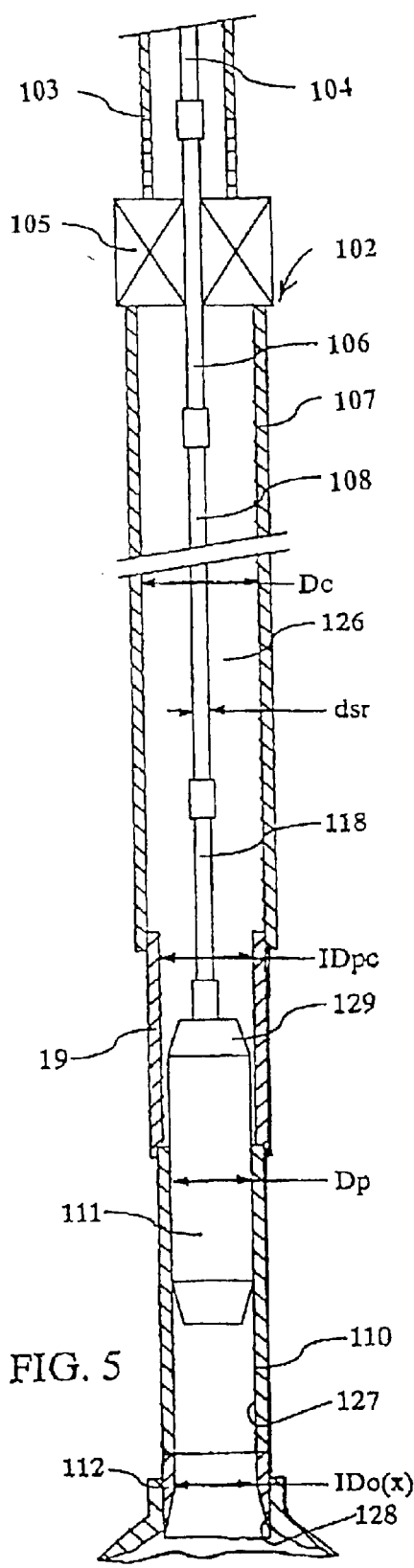
FIG. 5 is a cross-sectional view of the cylinder assembly of the second embodiment.
Figure 7:
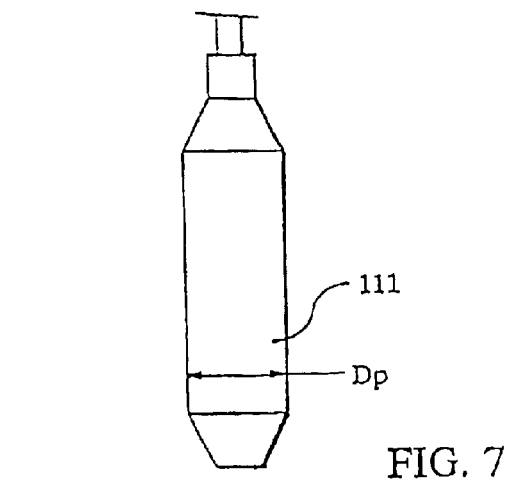
FIG. 7 is a view of plunger of the second embodiment.

Referring to FIGS. 4 and 5 of the drawing, the numeral 102 generally designates a device for producing shock waves in an injection well 121. A pump jack of the type illustrated in FIG. 1 of the drawing, or other pumping unit such as a hydraulically actuated cylinder, is installed at the well head. Other surface equipment, such as a casing valve, a tubing valve connected to an injection line and a stuffing box as illustrated in FIG. 1 of the drawing are also employed in combination with the device illustrated in FIGS. 4 and 5 of the drawing.

A tubing string 103 extends downwardly into a production casing 113 and a packer 115 is installed in the tubing string 103. A perforated cylinder 114 is installed at the lower end of tubing string 103 below the packer 115, which in turn is installed below the fluid level F in the injection well. A sealing device 105 is installed at the end of a perforated cylinder 114 and is connected to a cylinder assembly 122.

As best illustrated in FIG. 4 of the drawing, a bridge plug 132 may be set in the well bore above the bottom of the well 131 to effect hydraulic isolation of the section of the bore hole above the bridge plug from the portion of the bore hole below the bore plug. If a bridge plug is installed in the well bore, the depth of the well is considered the depth at which the bridge plug is installed.

The cylinder assembly 122 includes a vacuum tube 107 connected with the lower end of the sealing device 105, preventive cylinder 109 connected with the bottom of the vacuum tube 107, lower cylinder 110 connected with the bottom of the preventive cylinder 109 and an amplifier 112 connected with the bottom of the lower cylinder 110. The sealing device 105 contains the sealing rod 106, the cylinder assembly 122 contains a vacuum chamber 126, lower cylinder 110 contains an internal bore 127, amplifier 112 has a diffuser 128.

A plunger assembly 129 includes plunger 111 adapted to fit within the internal bore 127 of lower cylinder 110, at least one the stabilizing rod 118 and at least one sucker rod 108. The lower plunger 111 is connected with the pumping unit 101 with a polish rod 120 which extends through the stuffing box 117, plurality of sucker rods 104 which extend through tubing string 103, at least one sucker rod 108 and at least one the stabilizing rod 118 installed in the cylinder assembly 122. A sealing device 105 preferably includes one or more of different kinds of devices containing sealing rings or a precision pair of rod and cylinder.

Figure 6:
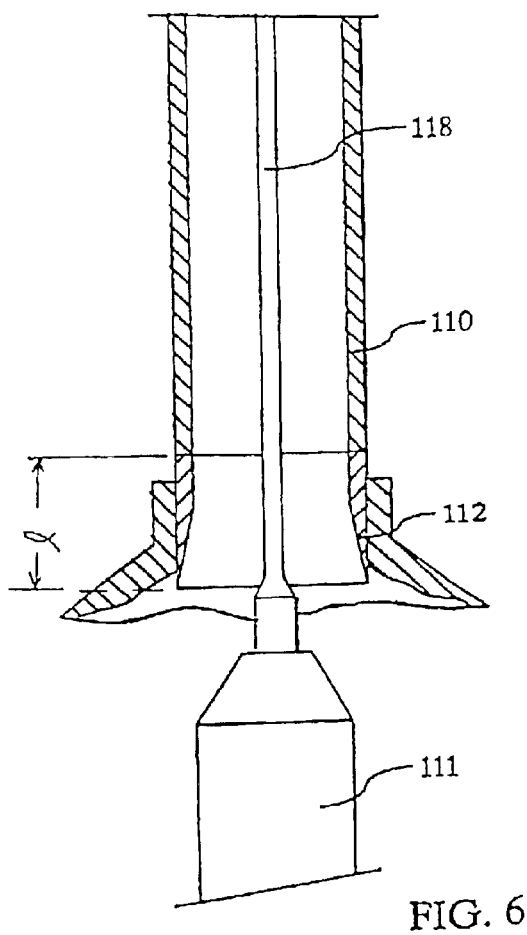
FIG. 6 is a cross-sectional view of the lower portion of the lower plunger, cylinder and an amplifier of the second embodiment.

As shown on FIG. 6 the lower plunger 111 connected with stabilizing rod 118 can exit out of lower cylinder 110 and amplifier 112 into the casing.

Operation

To generate shock waves in the injection well 121 using device the cylinder assembly 122 is installed inside the casing 113 of injection well at the end of the sealing device 105 connected with the bottom of the perforated cylinder 114, which, in turn, is connected with the tubing string 104 which is connected to injection line via valve. The packer 115 is used to separate the upper part of the well borehole from the lower one in order to prevent injection of water into the shallow layers of formation 130.

During the downstroke of the pumping unit, the plunger assembly 129 moving downward creates the vacuum inside the vacuum chamber 126 due to the fact that the plunger 111 increases the volume of the cylinder assembly 122 while the sealing device 105 provides the sealing of the cylinder assembly 122 at the upper end. At the moment the top of plunger 111 exits from the bottom of lower cylinder 110, water in casing 121 is discharged into the lower cylinder 110 and vacuum chamber 126 due to the difference of pressure inside the vacuum chamber 126 and hydrostatic pressure in casing 121, thereby generating a shock wave which travels downward and hits the bottom of the well and perforations 119. Part of the shock wave energy is reflected back toward the amplifier (and again is reflected to the bottom-hole) while part is transmitted into the surrounding bed or formation 130 thereby stimulating oil recovery and oil production. The water from casing refills the volume of the cylinder assembly 122 until the plunger 111 is re-inserted into the lower cylinder 110 at the beginning of an upstroke.

During the upstroke of pumping unit 101, the volume of the cylinder assembly is reduced. Accordingly, the water contained therein is compressed. At the moment the bottom of the plunger 111 exits the top of the lower cylinder 110, the compressed water contained in the cylinder assembly 122 is discharged into the lower cylinder 110 and farther into casing 121, thereby generating a shock wave which impacts the perforations 119 and the bottom of the injection well. Part of the shock wave energy is reflected back toward the amplifier (and again is reflected to the bottom-hole) while part is transmitted into the surrounding bed or formation 130 to improve the permeability of the formation thereby stimulating oil production and recovery.

There is the best application of the present invention for each combination of the following parameters: well depth, diameter and length of plunger and lower cylinder, diameter and length of the vacuum chamber, diameter and length of rod string, size of sealing device, length of stroke, number of strokes per minute, and properties of the injected water or other fluid. In particular, for a 3 meter length of stroke of the pumping unit, 6 strokes per minute, depth of the well bottom hole equaled 1070 m, volume of the vacuum chamber accounted for 0.2 m³, diameter of plunger 0.06985 m, inner diameter of sealing device equaled 0.05715 m, pressure inside the vacuum chamber accounted for 21.0 MPa, coefficient of the water compressibility accounted for $2 \times 10^3$ MPa, speed of sound in water equaled 1000 m/s, coefficient of air/gas content in the water accounted for 0.001, the dominant frequency of the formation accounted for 25 Hz, the a adiabatic coefficient of air equaled 1.4 In this case the best parameters of application are determined by the following formulas.

The optimum length of the tubing string is defined by the expression:

$$Lt = Hb - 0.5 \ c/f - Lca,$$

where $H_b$ is the depth of bottom of the well, c is a sound of speed of water containing in borehole, f is dominant frequency of formation, $L_{ca}$ is a length of a cylinder assembly. For $L_{ca}$=50 m, c=1000 m/s, f=25 Hz and $H_b$=1070 m the length of the tubing string has to be 1000 m in order to create the vibrations of the shock waves reflected from bottom hole and amplifier on the frequency corresponding the dominant frequency of formation f. In this case the resonance phenomenon will be observed and the radius of affection by the seismic waves will be substantially higher.

The high efficiency of the present invention is due to the high power of the shock wave created and the installation of the device in active injection well without a cement/bridge plug. A high power wave can be created because the pressure inside the vacuum chamber is not limited by the working pressure of the stuffing box 117, the "floating" of the polish rod 120, possible casing leaks and the absence of gas flowing into the casing from formation. The amplitude of shock wave at the bottom of downstroke $A^d_{sw}$ can be controlled by the parameters defined by the following formulae:

$$A^d_{SW} = \rho_w g H_{lc}[1 - \{\frac{4\beta_a V_c}{\pi(D_p^2 - D_{ls}^2)L_{str}}\}^k],$$

where $\rho_w$ is a water density, $\beta_a$ is a coefficient of air/gas content in the injected water, $V_c$ is a volume of the vacuum chamber 126, $D_p$ is a diameter of plunger 111, $D_{is}$ is an inner diameter of sealing device 106, k is the a adiabatic coefficient, $L_{str}$ is the length of stroke, g is the constant of the acceleration of gravity, $H_{lc}$ is the depth of installation of the lower cylinder. The amplitude of the shock wave in this case accounts for 9.5 MPa for the following values of parameters: $\rho_w$=1000 kg/m³, g=9.81 m/sec, $H_{lc}$=1000 m, $\beta_a$=0.001, $V_c$=0.2 m³, $D_p$=0.06985 m, $D_{is}$=0.05715 m, $L_{str}$=3.05 m, k=1.4 for air.

The present invention also allows to create the maximum pressure on the front of the shock wave on upstroke defined by the following formulae:

$$A^u_{SW} = k\frac{b}{V_c}\int_0^{T/2} [\frac{\pi}{4}(D_p^2 - D_{ls}^2)V_r - \frac{\pi}{\mu}P\delta^3 .0102(\frac{D_p}{L_p} + \frac{D_{ls}}{L_{ls}})]dt,$$

where π=3.14, T=60/n, n is quantity stroke per minute, b is the compressibility coefficient of the injection water, $V_c$ is the volume of the vacuum chamber 126, P is the pressure inside the vacuum chamber 26, $D_p$ is a diameter of plunger 111, $D_{is}$ is a an inner diameter of sealing device 105, $L_p$ is the length of plunger 111, $L_{is}$ is the length of sealing device 105, $V_r$ is the speed the motion of the sucker rod string 104, $\mu$ is viscosity of the injection water, k is the coefficient of fluid displacement by plunger 111, δ is a clearance inside the sealing device 105 and between the plunger 111 and lower cylinder 110.

The amplitude of this shock wave accounts for 20.0 MPa for the following values of parameters: k=0.55, b=$2 \times 10^3$ MPa, n=6 str/min, $V_c$=0.2 m³, $D_p$=0.05715 m, $D_{is}$=0.06985 m, $V_r$=0.6 m/sec, $\mu$_=$10^{-3}$ Pa sec, P=21 MPa, δ=$7.62 \times 10^{-5}$ m, $L_p$=$L_{is}$=0.91 m.

Hence the amplitude of shock wave can be gradually controlled by, say, changing of the number of strokes per minute n and the speed the motion of the rod string $V_r$ or, in other words, length of stroke $L_{str}$ by means of using a hydraulic pump.

In order to provide the vacuuming of the vacuum chamber 126 on downstroke the weight of rod string 104 and plunger assembly 129 must overcome the upwardly acting negative force created inside the vacuum chamber 126. Therefore the rods have to have some minimal radius. In other words, the diameter of sucker rods $d_r$ has to be not less than:

$$d_r \geq \{\rho_w/(\rho_s - \rho_w)[1 - \{\frac{4\beta_a V_c}{\pi(D_p^2 - D_{ls}^2)L_{str}}\}^k]\{D_p^2 - D_{ls}^2\}\}^{1/2},$$

where $\rho_w$ is a water density, $\rho_s$ is a steel density, $\beta_a$ is a coefficient of air/gas content in the injected water, $V_c$ is a volume of the vacuum chamber 126, $D_p$ is a diameter of plunger 119, $D_{is}$ is an inner diameter of sealing device 105, k is the a adiabatic coefficient, $L_{str}$ is the length of stroke. For above noted parameters of the present invention, namely, for $\rho_w$=1000 kg/m³, $\rho_s$=7800 kg/m3, $\beta_a$=0.001, $V_c$=0.2 m³, $D_p$=0.06985 m, $D_{is}$=0.05715 m, $L_{str}$=3.05 m, k=1.4 (for air) the diameter of sucker rods $d_r$ has to be not less than 0.0148 m in order to overcome the vacuum in vacuum chamber 126 created on downstroke.

In order to provide the intermittent exiting of the plunger 111 from the bottom and the top of lower cylinder 110 at the bottom of downstroke and at the top of upstroke, correspondingly, the length of lower cylinder has to be less some value defined by the formulae:

$$L_{lc} \le L_{str} - [\frac{L_r(D_p^2 - D_{is}^2)}{Ed_r^2}(P_u - P_d) + \frac{g(\rho_s - \rho_w)L_r^2}{E} + 2L_p],$$

where $L_{lc}$ is the length of the lower cylinder 110, $L_{str}$ is the length of stroke, $L_r$ is a length of the rod assembly 106, $D_p$ is the diameter of plunger, $D_{is}$ is the inner diameter of sealing device 105, E is modulus of elasticity of the rod's material, $P_u$ is the pressure inside the vacuum chamber 126 on upstroke, $P_d$ is the pressure inside the vacuum chamber 126 on downstroke, g is the constant of the acceleration of gravity, $\rho_w$ is a water density, $\rho_a$ is a steel density, $L_p$ is a length of the plunger. Hence for the parameters: $L_{str}$=3.05 m, E=2×10⁻MPa, $L_p$=0.9 m, $d_r$=0.0254 m, $P_u$=21 MPa, $P_d$=0.17 MPa, $D_p$=0.06985 m, $D_{is}$=0.05715 m, $L_r$=1070 m, $\rho_w$=1000 kg/m³, g=9.81 m/sec, $\rho_s$=7800 kg/m³ the length of the lower cylinder has to be not more than 0.5 m.

In addition, the present invention has high efficiency due to the installation of the amplifier 112 connected with the bottom of lower cylinder 110. Amplifier 112 decreases the energy losses of a shock wave up to 40–50% and increase its amplitude. Considering that the inner diameter of amplifier 112 (or diffuser 128) changes in accordance with expression $ID_a(x)=D_p \exp(x\alpha/2)$ (wherein x is a current length of amplifier, $\alpha$ is a coefficient), an optimum total length of amplifier l is defined by the formulae:

$$l = \frac{\alpha}{2m^2 - \alpha^2},$$

where $m=(\alpha^2-k^2)^{1/2}$, k=ω/c, ω is frequency of shock wave occurrence, c is the velocity of sound in the water or other fluid in the well. Coefficient k equals 0.0343 m⁻¹ if the amplifier 112 is installed 20 m above of bottom hole and c=1000 m /sec. Assuming that internal and external diameters of amplifier equals 0.06985 m and 0.1156 m, correspondingly, and α=13.6 m⁻¹, the parameter m equals 13.59 m⁻¹. So the optimum length of amplifier 112 accounts for 0.074 m. The coefficient of amplification A of amplifier 112 is described by the following formulae:

$$A = \frac{\exp(xl)}{[\alpha/2Sh(ml/2)/m + Ch(ml/2)]^2}.$$

where Sh(ml/2) and Ch(ml/2) are hyperbolic sine and cosine, correspondingly. Coefficient of amplification A equals 1.41 for above defined parameters.

In addition, the present invention has high efficiency due to the installation of the amplifier 112 on some distance from the bottom of the well thereby creating a sequence of reflections waves on the frequency coinciding with the dominant frequency of the formation and that allows substantially increase the area affected by the waves traveling through the formation. The installation distance of amplifier 112 is defined by the formulae:

$$S = \frac{c}{2f},$$

where c is the speed of sound in water in the borehole, f is the dominant frequency of the formation. The installation distance S equals, for example, 20 m for the following parameters: c=1000 m /sec, f=25 Hz ( see an article "residual Oil Reservoir Recovery with Seismic Vibrations" written by V. N. Nikolaevsky et al., published in SPE Production & Facilities, May 1996).

In addition, the present invention has high reliability provided by means of: installing of the preventive cylinder 109 allowing to eliminate the cavitation erosion of the top/bottom of the lower cylinder 110 and the bottom/top of the plunger 111 occurring due to the high velocity of water during the process of the water discharging from the borehole into the vacuum chamber 126 into the lower cylinder 110 at the bottom of downstroke and discharging of water from the vacuum chamber 126 into borehole at the top of the upstroke.

The inner diameter IDpc of the preventive cylinder 109 has to be not less than:

$$ID_{pe} \ge D_P(1 + \frac{ID_c^2 P}{D_p^2(\rho_w gH - P_d)\xi})^{1/2},$$

where $D_p$ is the diameter of the plunger 111, $ID_c$ is an inner diameter of vacuum chamber 126, $\rho_w$ is the density of the water, g is the constant of the acceleration of gravity, H is the installation depth of preventive cylinder 109, $P_d$ is the saturation vapor pressure, $\xi$ is the coefficient of the flow resistance, P is pressure inside vacuum chamber 126. In real numbers (the best application for the above noted parameters of present invention) the diameter of preventive cylinder 109 has to be not less than 0.079 m for the following values of parameters: $D_p$=0.06985 m, $ID_c$=0.0742 m, P=21 MPa, $\rho_w$=1000 kg/m³, g=9.81 m/sec, H=1000 m, $P_d$=0.17 MPa, $\xi$=9.0;

installing of the stabilizing rod 118 on the top of the plunger 111 preventing the possibility of the stability loss (i.e. bending) of rod 118 due to the high force affecting on the rod 118 immediately after the appearance of the shock wave. The length $L_{sr}$ of stabilizing rod 18 is defined by the formulae:

$$L_{sr} \le \pi I d_{sr} \frac{1}{n} \left( \frac{E}{P(D_p^2 - D_{is}^2)} \right)^{1/2},$$

Where π=3.14, I is the main central radius of inertia of cross section of stabilizing rod 118, $d_{sr}$ is a diameter of stabilizing rod 118, E is modulus of elasticity of the rod's material, P is the pressure inside the vacuum chamber 126, $D_p$ is the diameter of lower plunger 111, $D_{is}$ is the inner diameter of the sealing device 105, n is a safety coefficient. For example, for I=0.0254 m, $d_{sr}$=0.0254 m, n=2, E=2×10⁵ MPa, P=21 MPa, $D_p$=0.06985 m, $D_{is}$=0.05715 m the length of stabilizing rod 118 preferably does not exceed 2.52 m.

Figure 8:
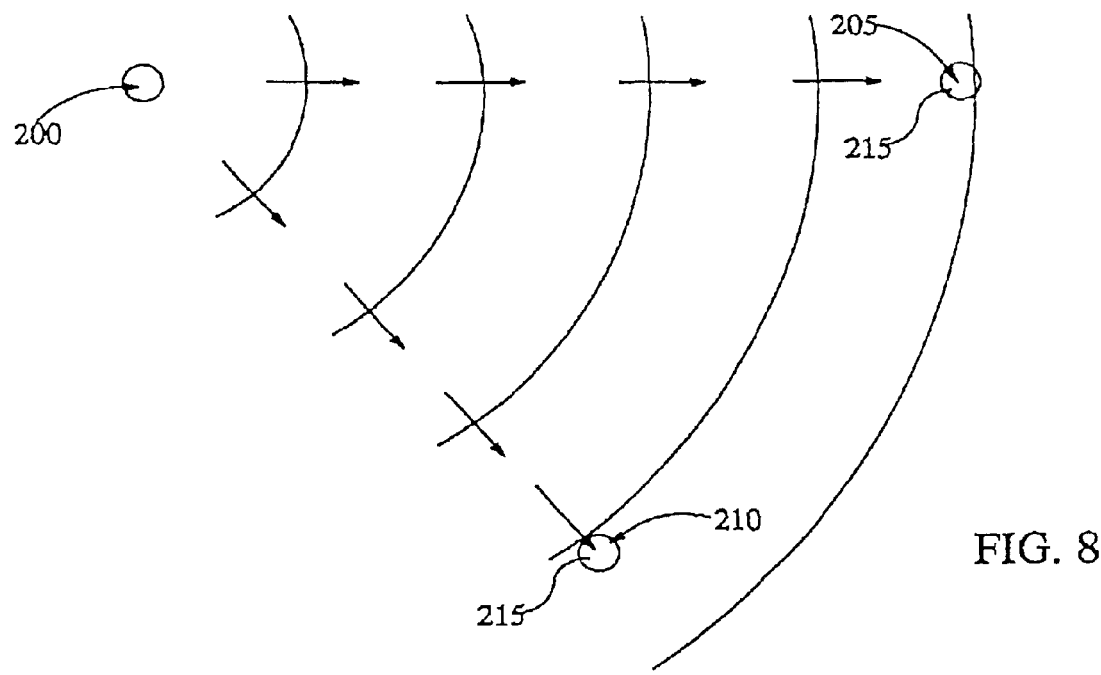
FIG. 8 is a diagrammatic view of a layout for a 4D-seismic survey.

Referring to FIG. 8 of the drawing, the numeral 200 refers to a source well having a device 2 or 102 mounted therein for producing seismic shock waves. Source well 200 is preferably an injection well used for water flood or for the delivery of a variety of well stimulation materials, such as steam, acid, surfactants or fracking materials.

Numerals 205 and 210 generally refer to observation wells, each of which is equipped with an array of geophones 215 which may be vertically stacked or multi-component geophones. The geophones are of conventional design and are connected to suitable equipment for recording multi-channel seismic signals and data.

Seismic data collected from observation wells 205 and 210 can be analyzed to determine the effectiveness of seismic waves delivered by devices 2 and 102 into the formation. Based on the recorded seismic data, the parameters of devices 2 and 102 may be adjusted to operate at the dominant frequency or natural frequency of the formation. For example, the frequency of pump jack 101 and the distance of amplifier 112 from the bottom of the well might be adjusted for tuning the device 201 to generate shock waves at the dominant frequency of the formation to provide optimum stimulation for increasing the permeability of the formation. Adjustment of the device 201 vertically in the well allows it to be positioned to produce shock waves at the dominant frequency to optimize pressure distribution into the formation. Shock waves traveling radially from the source well are reflected and refracted as they move through the formation to the geophones 215 at the observation wells. The waves can be observed and adjusted to optimize the effectiveness of device 201 to increase fluid flow toward the production wells in the field.

Figure 9:
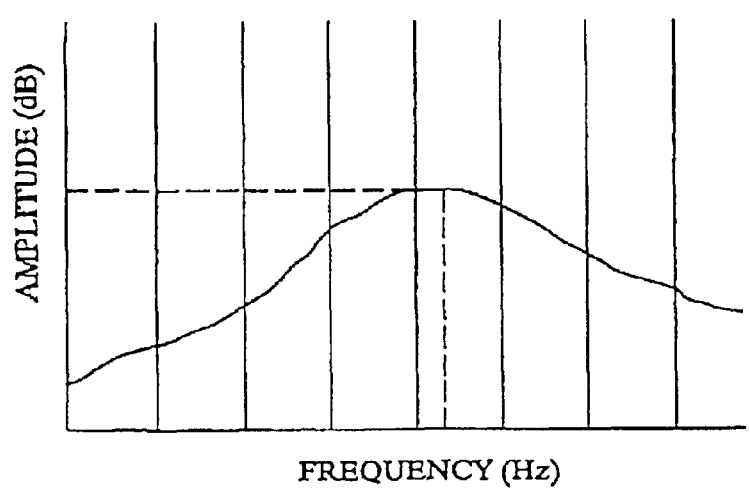
FIG. 9 is a graph of amplitude versus frequency.

As illustrated in FIG. 9, a graph of amplitude versus frequency shows that the amplitude increases as the frequency increases until it reaches a maximum at which time the amplitude decreases with a further increase in frequency. Data collected at the observation wells 205 and 210 can be used to determine the most effective frequency for stimulation of the formation. The formation filters out frequencies other than the dominant frequency.

The present invention has high efficiency due to the installation of the amplifier 112 on some distance S' from the bottom of the well or distance S from the bridge plug 132 (a bridge plug is installed if the bottom of the well exceeds the required distance from the amplifier 112) but below the perforations 119 thereby creating a sequence of reflected waves between the bottom of the well or bridge plug and amplifier 112 on the frequency coinciding with the dominant frequency of the formation and that allows a substantial increase in the area of affection by the waves created by the invention that travel through the formation. The distance the amplifier 112 is to be installed above the bottom 131 of the well or bridge plug 132 is defined by the following formulae:

$$S = \frac{c}{2f},$$

where c is the sound of speed of fluid containing in the borehold, f is dominant frequency of formation. The installation distance S equals, for example, 33 feet for the following parameters: c=1000 m/sec, f=25 Hz (see an article *"residual Oil Reservoir Recovery with Seismic Vibrations"* written by V. N. Nikolaevsky et al., published in SPE Production & Facilities, May 1996—see the frequency spectra at the different distances from an explosion). The dominant frequency is determined by installation of geophone(s) 215 on the same productive layer in one of the offset wells 205 and 210 and generating at least one shock wave. A frequency spectrum is measured by geophone 215, the frequency having the highest amplitude will be the dominant frequency of the formation, as shown in FIG. 9. After that the distance of installation S (as well as depth of installation) is determined by the above noted formulae, the dominant frequency for each sublayer also can be determined by means of installation of geophones on the depth corresponding to the particular sublayer and carrying out the measurement. Also, the dominant frequency can be determined for the different areas of the reservoir using this procedure.

Geophones 215 and equipment required for collecting and recording seismic data are commercially available from GEOVision Geophysical Services, a Division of Blackhawk Geometrics of Corona, Calif. This equipment is known to persons skilled in the art and further description is not deemed necessary.

For 4-D seismic graphing this set up is particularly efficient because the source is precisely controllable and has the constant frequency spectrum and the seismic waves are reproduceable over extended periods of time. Thus, data which is incompatible does not have to be mathmatically manipulated and analyzed for producing the maps to determine the location of pockets or the effectiveness of seismic or other stimulation of the formation.

Terms such as "horizontal," "vertical," "up," and "down" when used in reference to the drawings, generally refer to the orientation of the parts in the illustrated embodiment and not necessarily in the described orientation during use. The device may be used in vertical, deviated or horizontal wells and may be used to stimulate flow of water, steam and other fluids used for treatment of the formation and for increasing recovery of water and other fluids in addition to gas, oil and other petroleum products.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

Having described the invention, we claim:

1. A method of producing a shock wave in a well having a borehole extending into a formation comprising the steps of:

positioning a device having a chamber and an internal bore in liquid in the borehole such that the internal bore is in fluid communication with liquid in the well, said internal bore and said chamber having cross-sectional areas, said cross-sectional area of the internal bore being less than the cross-sectional area of the chamber;

delivering liquid into the bore;

moving a piston on a piston assembly through the bore to pressurize liquid in the chamber;

moving the piston out of the bore into the chamber for releasing pressurized liquid through the bore into the liquid in the well to form shock waves in the liquid, said piston assembly including a rod and a piston, said rod extending through a second bore in sealing relation with said rod; and;

adjusting the distance between the device and the bottom of the well to a distance which is sufficient to adjust the frequency of reflected waves traveling back and forth between the device and the bottom of the well relative to the dominant frequency of the formation.

2. A method of producing a shock wave comprising the steps of:

positioning a device having a chamber and an internal bore in liquid in a borehole of a well extending into a formation such that the device is submerged in the liquid, said internal bore and said chamber having cross-sectional areas, said cross-sectional area of the internal bore being less than the cross-sectional area of the chamber;

delivering liquid into the chamber and the bore;

moving a piston on a piston assembly through the bore to pressurize liquid in the chamber;

moving the piston out of the bore into the chamber for releasing pressurized liquid through the bore into the liquid in which the device is submerged, said piston assembly including a rod and a piston, said rod extending through a second bore in sealing relation with said second bore;

collecting data related to movement of seismic waves through the formation; and adjusting parameters of the seismic waves such that their frequency is substantially equal to the dominant frequency of the formation.

3. A method according to claim 2, said rod being a sucker rod which extends through a tubing string in the well.

4. A method according to claim 3, said tubing string having a length defined by the expression:

$$Lt = Hb - 0.5c/f - Lca,$$

where Hb is the depth of the bottom of the well, c is the speed of sound in the liquid in the well, f is the dominant frequency of the formation, and Lca is the length of said device having a chamber and an internal bore.

5. The method of claim 2, wherein the step of adjusting parameters of seismic waves such that their frequency is substantially equal to the dominant frequency of the formation comprises:

adjusting the distance between the end of the lower bore and the bottom of the well to a distance which is sufficient to cause the frequency of reflected waves to travel back and forth between the end of the lower bore and the bottom of the well to be substantially equal to the dominant frequency of the formation.

6. The method of claim 2, wherein the step of adjusting parameters of the seismic wave to the natural frequency of the formation comprises:

initially positioning an amplifier on the end of the lower bore a distance from the bottom of the well in a predetermined range;

collecting and evaluating seismic data after compressed liquid has been released through the lower bore into the well; and adjusting the distance between the amplifier on the lower bore and the bottom of the well to a distance which is sufficient to cause the frequency of reflected waves to travel back and forth between the amplifier and the bottom of the well to be substantially equal to the dominant frequency of the formation.

7. The method of claim 6, wherein the step of adjusting the distance between the amplifier on the lower bore and the bottom of the well to a distance which is sufficient to cause the frequency of reflected waves to travel back and forth between the end of the lower bore and the bottom of the well to be substantially equal to the dominant frequency of the formation comprises:

adjusting the length of said sucker rod and said tubing string for adjusting the position of said amplifier relative to the bottom of the well in which it is installed.

8. The method of claim 2 wherein the step of collecting data related to movement of the seismic waves through the formation comprises:

positioning geophones in production wells located remotely from the well in which said device having a chamber and an internal bore is positioned; and recording seismic data received by the geophones.

9. The method of claim 2, wherein data related to movement of the seismic wave through the formation is collected at a location in a range between about 1 mile and about 2 miles from said well in which said device having a chamber and an internal bore is positioned.

10. The method of claim 2, with the addition of the steps of:

positioning apparatus for collecting seismic data at a location spaced from said well;

collecting data periodically for use in performing three-dimensional modeling of velocity distribution and reflectivities; and comparing modeling distributions observed at a first time to modeling distributions observed at a later time for producing a 4-D seismic map of the formation.

11. A method according to claim 2, wherein the pressure chamber has a cross-sectional area which is greater than the cross-sectional area of the plunger.

12. A method according claim 3, wherein the well is an injection well and said device having a chamber and an internal bore is installed in the lower portion of the injection well, with the addition of the steps of:

installing a packer in the tubing string for isolating the annulus of the well above the packer from the annulus below the packer;

installing a perforated cylinder below the packer;

installing said device having a chamber and an internal bore below the bottom of said perforated cylinder;

delivering liquid through said tubing string and said perforated cylinder into the annulus of the well below said packer; and displacing said piston assembly from said chamber through said lower bore to vacuum the water contained inside said chamber and to release the liquid from the annulus of the injection well into said chamber for producing a second shock wave in the well.

13. A method as defined in claim 12, said piston assembly compressing the liquid contained inside said chamber on an upstroke and discharging the liquid from inside said chamber into said borehole of the injection well.

14. A method as defined in claim 13, wherein the amplitude of the shock wave at the top of an upstroke $A''_{sw}$ is defined by the formulae:

$$A^u_{SW} = k \frac{b}{V_c} \int_0^{T/2} [\frac{\pi}{4}(D_p^2 - D_{ls}^2)V_r - \frac{\pi}{\mu}P\delta^3 \_.0102(\frac{D_p}{L_p} + \frac{D_{ls}}{L_{ls}})]dt,$$

where $\pi=3.14$, $T=60/n$, n is quantity stroke per minute, b is the compressibility coefficient of the injection water, $V_c$ is the volume of the chamber, P is the pressure inside the chamber, $D_p$ is a diameter of piston, $D_{is}$ is a an inner diameter of sealing device, $L_p$ is the length of piston, $L_{is}$ is the length of sealing device, $V_r$ is the speed the motion of the sucker rod string, $\mu$ is viscosity of the injection water, k is the coefficient of fluid displacement by the piston, $\delta$ is a clearance inside the sealing device and between the piston and lower cylinder.

15. A method as defined in claim 12, said piston assembly vacuuming the liquid contained inside said chamber on a downstroke and discharging the liquid from said annulus into said chamber when the piston moves out of the lower bore.

16. A method as defined in claim 15, wherein the amplitude of the second shock wave at the bottom of a downstroke $A^d_{sw}$ is defined by the formulae:

$$A^d_{SW} = \rho_w g H_{lc}[1 - \{\frac{4\beta_a V_c}{\pi(D_p^2 - D_{ls}^2)L_{str}}\}^k],$$

where $\rho_w$ is a water density, $\beta_a$ is a coefficient of air/gas content in the injected water, $V_c$ is a volume of the vacuum chamber, $D_p$ is a diameter of piston, $D_{is}$ is an inner diameter of sealing device, k is the a adiabatic coefficient, $L_{str}$ is the length of stroke, g is the constant of the acceleration of gravity, $H_{lc}$ is the depth of installation of the lower cylinder.

17. A method as defined in claim 2, wherein the well is a deviated well and said device having a chamber and an internal bore is installed in a non-vertical part of the deviated well.

18. A method for producing seismic waves in an oil-bearing formation, comprising the steps of:

positioning a cylinder assembly having a pressure chamber and upper and lower internal bores communicating with said chamber in a well such that the cylinder assembly is submerged in liquid in the well;

positioning a plunger assembly such that a rod on the plunger assembly extends through and seals the upper bore and a plunger reciprocates in said lower bore and is drawn into said chamber;

reciprocating the rod and plunger such that movement of the rod and plunger compresses liquid in the chamber and releases compressed liquid through the lower bore into the well when the plunger moves from the lower bore into the chamber; and moving the plunger assembly from the pressure chamber into said lower bore to vacuum the water contained inside said pressure chamber and to release water from the well into said chamber when the plunger moves from the lower bore into the well.

19. A method according to claim 18, wherein the pressure chamber has a cross-sectional area which is greater than the cross-sectional area of the plunger.

20. A method according to claim 18, wherein the cylinder assembly is positioned near the bottom of the well.

21. A method according to claim 18, wherein the well is partially filled with liquid.

22. The method of claim 18, wherein the amplitude of the shock wave formed when the plunger moves from the lower bore into the chamber is defined by the formulae:

$$A^u_{SW} = k\frac{b}{V_c}\int_0^{T/2}[\frac{\pi}{4}(D_p^2 - D_{ls}^2)V_r - \frac{\pi}{\mu}P\delta^3\_.0102(\frac{D_p}{L_p} + \frac{D_{ls}}{L_{ls}})]dt,$$

where $\pi=3.14$, $T=60/n$, n is quantity stroke per minute, b is the compressibility coefficient of the injection water, $V_c$ is the volume of the vacuum chamber, P is the pressure inside the vacuum chamber, $D_p$ is a diameter of plunger, $D_{is}$ is a an inner diameter of sealing device, $L_p$ is the length of plunger, $L_{is}$ is the length of sealing device, $V_r$ is the speed the motion of the sucker rod string, $\mu$ is viscosity of the injection water, k is the coefficient of fluid displacement by plungers, $\delta$ is a clearance inside the sealing device and between the plunger and lower cylinder.

23. A method as defined in claim 18, wherein the amplitude of the shock wave formed when the plunger moves from the lower bore into the well is defined by the formulae:

$$A^d_{SW} = \rho_w g H_{lc}[1 - \{\frac{4\beta_a V_c}{\pi(D_p^2 - D_{ls}^2)L_{str}}\}^k],$$

where $\rho_w$ is a water density, $\beta_a$ is a coefficient of air/gas content in the injected water, $V_c$ is a volume of the vacuum chamber, $D_p$ is a diameter of plunger, $D_{is}$ is an inner diameter of sealing device, k is the a adiabatic coefficient, $L_{str}$ is the length of stroke, g is the constant of the acceleration of gravity, $H_{lc}$ is the depth of installation of the lower cylinder.

24. A method for producing seismic waves in an oil-bearing formation, comprising the steps of:

positioning a cylinder assembly having a pressure chamber and upper and lower internal bores communicating with said chamber in a well such that the cylinder assembly is submerged in liquid in the well;

positioning a plunger assembly such that a rod on the plunger assembly extends through and seals the upper bore and a plunger reciprocates in said lower bore and is drawn into said chamber;

reciprocating the rod and plunger such that movement of the rod and plunger compresses liquid in the chamber and releases compressed liquid through the lower bore into the well when the plunger moves from the lower bore into the chamber;

collecting data related to movement of seismic waves through the formation; and adjusting parameters of the seismic waves such that their frequency is substantially equal to the dominant frequency of the formation.

25. The method of claim 24, wherein the step of adjusting parameters of seismic waves such that their frequency is substantially equal to the dominant frequency of the formation comprises:

adjusting the distance between the end of the lower bore and the bottom of the well to a distance which is sufficient to cause the frequency of reflected waves to travel back and forth between the end of the lower bore and the bottom of the well to be substantially equal to the dominant frequency of the formation.

26. The method of claim 24, wherein the step of adjusting parameters of the seismic waves such that their frequency is substantially equal to the dominant frequency of the formation comprises:

initially positioning an amplifier on the end of the lower bore a distance from the bottom of the well not less than 200 feet;

collecting and evaluating seismic data after compressed liquid has been released through the lower bore into the well; and adjusting the distance between the amplifier on the lower bore and the bottom of the well to a distance which is sufficient to cause the frequency of reflected waves to travel back and forth between the end of the lower bore and the bottom of the well to be substantially equal to the dominant frequency of the formation.

27. A method as defined in claim 26, wherein said amplifier is installed at a distance from the bottom of the well defined by the formulae:

$$S = \frac{c}{2f},$$

where c is the speed of sound through liquid in the well, and f is the dominant frequency of the formation.

28. The method of claim 26, wherein the step of adjusting parameters of the seismic wave to the dominant frequency of the formation comprises the steps of:

initially positioning the lower end of the amplifier a distance from the bottom of the well in a range of between 300 and 400 feet.

29. Apparatus for producing a shock wave in liquid in a borehole, comprising:

(a) a tubing string extending into the borehole;
(b) a cylinder assembly connected with the tubing string, said cylinder assembly containing an elongated internal chamber having an upper bore and a lower bore, said upper bore having a cross-sectional area which is less than the cross-sectional area of the lower bore, said cylinder assembly including a preventive cylinder between said upper bore and said lower bore, said preventive cylinder having a bore having a cross-sectional area greater than the cross-sectional area of said lower bore;
(c) means for positioning said cylinder assembly such that at least a portion of said cylinder assembly is submerged in liquid in the borehole and said internal chamber is at least partially filled with liquid;
(d) a plunger assembly including a seal engaging said upper bore and a plunger movably arranged to move within said lower bore and into said preventive cylinder for compressing a portion of the liquid contained within said internal chamber and discharging the liquid into the borehole when said plunger moves through said lower bore into said preventive cylinder to form seismic waves in the liquid in the borehole; and
(e) pumping means connected with said plunger assembly for displacing said plunger assembly within said cylinder assembly.

30. Apparatus for producing a shock wave in liquid in a borehole, according to claim 29, said a plunger assembly including upper and lower plungers movably arranged within said internal chamber for compressing a portion of the liquid in said internal chamber on an upstroke and a check valve in said lower plunger configured to open on a downstroke for delivering liquid into said internal chamber, said cylinder assembly connected with the tubing string comprising:

(a) an upper cylinder containing said upper bore, said upper bore being adapted to receive said upper plunger;
(b) a lower cylinder arranged below said upper cylinder, said lower cylinder containing said lower bore and being adapted to receive said lower plunger, said lower bore having a cross-sectional area greater than said upper bore cross-sectional area, said lower cylinder further having a lower end containing an opening;
(c) a compression cylinder defining said internal chamber arranged between said upper and said lower cylinders; and
(d) a crossover cylinder arranged between said lower cylinder and said compression cylinder.

31. Apparatus for producing a shock wave in liquid in a borehole, according to claim 29, said a tubing string extending into the borehole having a length defined by the expression:

$$Lt = Hb - 0.5c/f - Lca,$$

where Hb is the depth of bottom of the well, c is the speed of sound in the liquid in the borehole, f is the dominant frequency of the formation, and Lca is a length of said cylinder assembly.

32. Apparatus for producing a shock wave in liquid in a borehole, according to claim 29, wherein said well is an injection well, with the addition of:

a packer in said tubing string;
a perforated cylinder in said tubing string below said packer; and
sealing means connected between said perforated cylinder and cylinder assembly such that liquid flows through said tubing string and said perforated cylinder into said borehole below said packer; and
an amplifier connected to said cylinder assembly, said amplifier being positioned to block propagation of shock waves past said amplifier.

33. Apparatus for producing a shock wave in liquid in a borehole, according to claim 32, with the addition of:

a preventive cylinder connected between said cylinder assembly and said amplifier to prevent erosion of said cylinder assembly and said amplifier by fluid flowing into and out of said internal chamber.

34. Apparatus for producing a shock wave in liquid in a borehole, according to claim 32, said plunger assembly comprising:

a sucker rod connected with said seal; and
a stabilizing rod connected with said sucker rod, said plunger being connected with said stabilizing rod movably arranged within said internal chamber and said lower bore.

35. Apparatus as defined in claim 33, wherein a lower cylinder arranged below said preventive cylinder, said lower cylinder containing an internal bore adapted to receive said plunger.

36. Apparatus as defined in claim 35, wherein said preventive cylinder has an inner diameter defined by the formulae:

$$ID_{pc} \geq D_p \left(1 + \frac{ID_c^2 P}{D_p^2 (\rho_w g H - P_d) \xi}\right)^{1/2},$$

where $ID_{pc}$ inner diameter of preventive cylinder, $D_p$ is the diameter of cylinder, $ID_c$ is an inner size of vacuum chamber, $\rho_w$ is the density of water, g is the constant of the acceleration of gravity, H is the installation depth of preventive cylinder, $P_d$ is the saturation vapor pressure, $\xi$ is the coefficient of the flow resistance, P is pressure inside vacuum chamber.

37. Apparatus as defined in claim 32, wherein said amplifier, with inner diameter changing in accordance with expression $IDa(x) = Dp \exp(x\alpha/2)$, has a length defining by the formulae:

$$1 = \frac{\alpha}{2m^2 - \alpha^2},$$

where $m = (\alpha^2 - k^2)^{1/2}$, $k = \omega/c$, $\omega$ is frequency of shock wave occurrence, c is a sound of velocity in the water, x is a current length of amplifier, $\alpha$ is a coefficient.

38. Apparatus as defined in claim 34, wherein said sucker rod has a radius dr not less than:

$$d_r \geq \{\rho_w/(\rho_s - \rho_w)[1 - \{\frac{4\beta_a V_c}{\pi(D_p^2 - D_s^2)L_{str}}\}^k](D_p^2 - D_{ls}^2)\}^{1/2},$$

where $\rho_w$ is a water density, $\rho_s$ is a steel density, $\beta_a$ is a coefficient of air/gas content in the injected water, Vc is a volume of the vacuum chamber, $D_p$ is a diameter of plunger, Dis is an inner diameter of sealing device, k is the a adiabatic coefficient, $L_{str}$ is the length of stroke.

39. Apparatus as defined in claim 34, wherein said stabilizing rod has the length defined by the formulae:

$$L_{sr} \leq \pi l d_{sr} \frac{1}{n} (\frac{E}{P(D_p^2 - D_{ls}^2)})^{1/2},$$

where $L_{sr}$ is the length of stabilizing rod, $\pi$=3.14, I is the main central radius of inertia of cross section of middle rod, $d_{sr}$ is a diameter of middle rod, E is modulus of elasticity of the rod's material, P is the pressure inside the vacuum chamber, $D_p$ is the diameter of plunger, $D_{is}$ is the inner diameter of sealing device, n is a safety coefficient.

40. Apparatus as defined in claim 34, wherein said plunger has a taper on both of its ends with angle $\alpha$ not less than 10° and the ratio between length of said taper $L_t$ and diameter of $D_p$ said plunger has to be not more 0.5.

41. Apparatus as defined in claim 35, wherein the length of said lower cylinder is defined by the following formulae:

$$L_{lc} \leq L_{str} - [\frac{L_r(D_p^2 - D_{ls}^2)}{Ed_r^2}(P_u - P_d) + \frac{g(\rho_s - \rho_w)L_r^2}{E} + 2 Lp],$$

where $L_{lc}$ is the length of the lower cylinder, $L_{str}$ is the length of stroke, $L_r$ is a length of the rod assembly, $D_p$ is the diameter of plunger, $D_{is}$ is the inner diameter of sealing device, E is modulus of elasticity of the rod's material, $P_u$ is the pressure inside the vacuum chamber on upstroke, $P_d$ is the pressure inside the vacuum chamber on downstroke, g is the constant of the acceleration of gravity, $\rho_w$ is a water density, $\rho_s$ is a steel density, $L_p$ is a length of the plunger.

42. Apparatus for producing a shock wave in liquid in a borehole, comprising:
 (a) a tubing string extending into the borehole;
 (b) a cylinder assembly connected with the tubing string, said cylinder assembly containing an elongated internal chamber having an upper bore and a lower bore, said upper bore having a cross-sectional area which is less than the cross-sectional area of the lower bore;
 (c) means for positioning said cylinder assembly such that said cylinder assembly is submerged in liquid in the borehole and said internal chamber is filled with liquid;
 (d) a plunger assembly including a seal engaging said upper bore and a lower plunger movably arranged within said lower bore and into said internal chamber for compressing a portion of the liquid contained within said internal chamber and discharging the liquid into the borehole when said plunger moves through said lower bore into said internal chamber; and
 (e) pumping means connected with said plunger assembly for displacing said plunger assembly within said cylinder assembly, wherein said pumping means connected with said plunger assembly is configured for moving said plunger assembly from said cylinder assembly through said lower bore for vacuuming the liquid contained within said cylinder assembly and allowing the liquid contained in said borehole to be discharged into the said cylinder assembly.

43. Apparatus for producing a shock wave in liquid in a borehole, comprising:
 (a) a tubing string extending downwardly into the borehole;
 (b) a cylinder assembly connected with the tubing string, said cylinder assembly containing an elongated internal chamber;
 (c) means for positioning said cylinder assembly in the borehole such that said internal chamber is at least partially filled with a liquid;
 (d) a plunger assembly including upper and lower plungers movably arranged within said internal chamber for compressing a portion of the liquid contained within said internal chamber and discharging the liquid into the borehole; and
 (e) pumping means connected with said plunger assembly for displacing said plunger assembly within said cylinder assembly, wherein said cylinder assembly includes:
  (i) an upper cylinder containing an internal bore adapted to receive said upper plunger;
  (ii) a lower cylinder arranged below said upper cylinder, said lower cylinder containing an internal bore adapted to receive said lower plunger, said lower cylinder internal bore having a cross-sectional area greater than said upper cylinder internal bore cross-sectional area, said lower cylinder further having a lower end containing an opening;
  (iii) a compression cylinder defining a compression chamber arranged between said upper and said lower cylinders; and
  (iv) a crossover cylinder arranged between said lower cylinder and said compression cylinder, said crossover cylinder having an internal bore which has a cross-sectional area greater than said lower cylinder internal bore cross-sectional area, and less than the cross-sectional area of said compression cylinder to prevent erosion of said cylinder assembly by fluid flowing into and out of said internal chamber.

44. Apparatus as defined in claim 43, wherein said lower plunger has a cross-sectional area greater than said upper plunger cross-sectional area.

45. Apparatus as defined in claim 44, wherein said lower plunger includes an upper portion having a generally smooth outer perimeter, and a lower portion containing a plurality of flow channels.

46. Apparatus as defined in claim 45, wherein said lower plunger is movable between a first position wherein said lower plunger upper portion is contained at least partially within said lower cylinder, and a second position wherein said lower plunger lower portion is contained at least partially within said crossover cylinder.

47. Apparatus as defined in claim 46, wherein said pumping means includes a pumping unit connected with said plunger assembly for reciprocally displacing said plunger assembly between said first and second positions.

48. Apparatus as defined in claim 47, wherein said upper plunger is rigidly connected with said lower plunger with a connection rod.

49. Apparatus as defined in claim 48, wherein said lower plunger includes flow-through means for allowing liquid to flow upwardly through said lower plunger into said compression chamber when said lower plunger is displaced downwardly in said cylinder assembly.

50. Apparatus as defined in claim 49, wherein said flow-through means includes an internal bore extending through said lower plunger, and a ball movably contained within said plunger adjacent said bore, whereby when said lower plunger is displaced upwardly in said cylinder assembly, said ball engages said bore to prevent the flow of liquid through said lower plunger, and when said lower plunger is displaced downwardly in said cylinder assembly, said ball disengages said bore, thereby allowing liquid to flow through said lower plunger into said compression chamber.

51. Apparatus for producing shock waves in liquid in a borehole extending into a formation comprising:
 (a) a source of pressurized fluid having an outlet opening;
 (b) means for positioning said source of pressurized fluid in communication with liquid in a borehole;
 (c) means for periodically releasing pressurized fluid from said source of pressurized fluid into said liquid in the borehole to form shock waves in the liquid in the borehole; and
 (f) means for adjusting parameters of the shock waves in the liquid in the borehole such that their frequency is substantially equal to the dominant frequency of the formation.

52. Apparatus for producing a shock waves in liquid in a borehole extending into a formation, as defined in claim 51, said means for adjusting parameters of the shock waves in the liquid in the borehole such that their frequency is substantially equal to the dominant frequency of the formation comprising:
 means for adjusting the distance between said outlet opening and the bottom of the well to a distance which is sufficient to adjust the frequency of reflected waves traveling back and forth between the outlet opening and the bottom of the well relative to the dominant frequency of the formation.

53. Apparatus for producing a shock waves in liquid in a borehole extending into a formation, as defined in claim 51, said means for adjusting parameters of the shock waves in the liquid in the borehole such that their frequency is substantially equal to the dominant frequency of the formation, comprising:
 means for initially positioning said outlet a predetermined distance from the bottom of the well;
 means for collecting and evaluating seismic data after compressed fluid has been released through the outlet into the well; and
 means for adjusting the distance between the outlet and the bottom of the well to a distance which is sufficient to cause the frequency of reflected waves that travel back and forth between the outlet and the bottom of the well to be substantially equal to the dominant frequency of the formation.

54. A method of producing shock waves in a well having a borehole extending into a formation comprising the steps of:
 producing seismic shock waves in a source well;
 collecting and analyzing data from an array of geophones in an observation well spaced from said source well to determine the effectiveness of seismic waves delivered into the formation; and
 adjusting the parameters of seismic shock waves produced in the source well to operate at a frequency which is approximately the dominant frequency of the formation.

* * * * *